Patented Mar. 25, 1952

2,590,208

UNITED STATES PATENT OFFICE 2,590,208

PROCESS FOR PREPARING CYCLOHEXENE

Hans F. Rickert, Leverkusen-Bayerwerk, Eberhard Stein, Leverkusen, and Otto Bayer, Leverkusen-Bayerwerk, Germany, assignors to Farbenfabriken Bayer, Leverkusen, Germany No Drawing. Application September 27, 1950, Serial No. 187,151. In Germany September 21, 1949

3 Claims. (Cl. 260—666)

The present invention relates to improvements in the manufacture of cyclohexene and more particularly it relates to improvements in the manufacture of cyclohexene by splitting off hydrogen halide from halogenocyclohexane.

In accordance with prior art processes cyclohexene is prepared by splitting off hydrogen halide from halogenocyclohexane while using besides solid catalysts also liquid organic bases, such as pyridine, quinoline, as catalysts for the splitting off. When using organic bases at least about theoretical quantities have to be used as catalysts which is a serious drawback of this process.

In accordance with the present invention it has been found that phthalic acid anhydride and its substitution products, such as halogeno phthalic acid anhydrides are best adapted for catalysing the splitting off of hydrogen halide from halogenocyclohexanes, such as chloro-, bromo-, iodo-cyclohexanes, at higher temperatures preferably at temperatures of between about 250 and about 300° C. Only catalytic quantities are necessary for the reaction. The splitting off of hydrogen halide is effected at temperatures below the boiling point of the catalyst, so that the reaction products distil continuously in admixture with the unchanged starting product, without it being necessary to separate the liquid catalyst from the reaction products.

The phthalic acid anhydride or its substitution products as, for instance, dichlorophthalic acid anhydride can be used as such or also dissolved in an inert organic diluent boiling above about 250° C. such as diphenyl, anthracene and so on.

In accordance with a preferred feature of the invention the liquid catalyst is circulated and the halogeno, e. g., chloro cyclohexane is introduced in gaseous form. The hydrogen halide which is split off escapes together with the reaction products distilling over and is washed out in the usual manner, for instance by water. It should be borne in mind that Friedel-Crafts-catalysts and metals forming same with hydrogen halide must be kept away from the reaction since they possibly effect isomerisation.

Example

Through a vertical pipe of about 1 meter length which is filled with 1 kg. of molten phthalic acid anhydride having a temperature of between 260– 270° C. 100 g. of gaseous chlorocyclohexane are passed from below. The reaction products distilling at the upper end of the pipe, consisting substantially of cyclohexene, chlorocyclohexane and hydrogen chloride are washed with water to eliminate the hydrogen chloride. The remaining mixture is distilled in a 10-plate column.

After first runnings of about 0.5% pure cyclohexene is obtained in a yield of 73–80% of the theoretical. The residue of distillation consisting of unchanged chlorocyclohexane can be reintroduced directly into the process or after a distillation treatment. Calculated on the quantity of chlorocyclohexane introduced into the process the yield of pure cyclohexene amounts to about 90%. The catalyst is effective for at least 500 hours. If after this lapse of time the phthalic acid anhydride has darkened because of the carbonization of small amounts of chlorocyclohexane it can be purified or new amounts of phthalic acid anhydride may be added and the mixture used again.

We claim:

1. In a process for preparing cyclohexene the step which comprises heating a halogenocyclohexane in contact with a compound of the group consisting of phthalic acid anhydride and halogen substitution products of phthalic acid anhydride to a temperature sufficient to split off hydrogen halide from the halogenocyclohexane.

2. Process as claimed in claim 1 in which the temperature is kept between about 250 and about 300° C.

3. In a process for preparing cyclohexene the step which comprises heating chlorocyclohexane in contact with phthalic acid anhydride to a temperature between about 250 and about 300° C.

HANS F. RICKERT.
EBERHARD STEIN.
OTTO BAYER.

REFERENCES CITED

The following references are of record in the file of this patent:

"A Modification of the Gabriel Synthesis of Amines," by H. R. Ing et al., Chemical Society Journal 1926, part II, page 2349.